Jan. 9, 1962 C. G. STALL 3,015,895
EDUCATIONAL TOY
Filed Sept. 19, 1960 4 Sheets-Sheet 1

INVENTOR.
CASH G. STALL

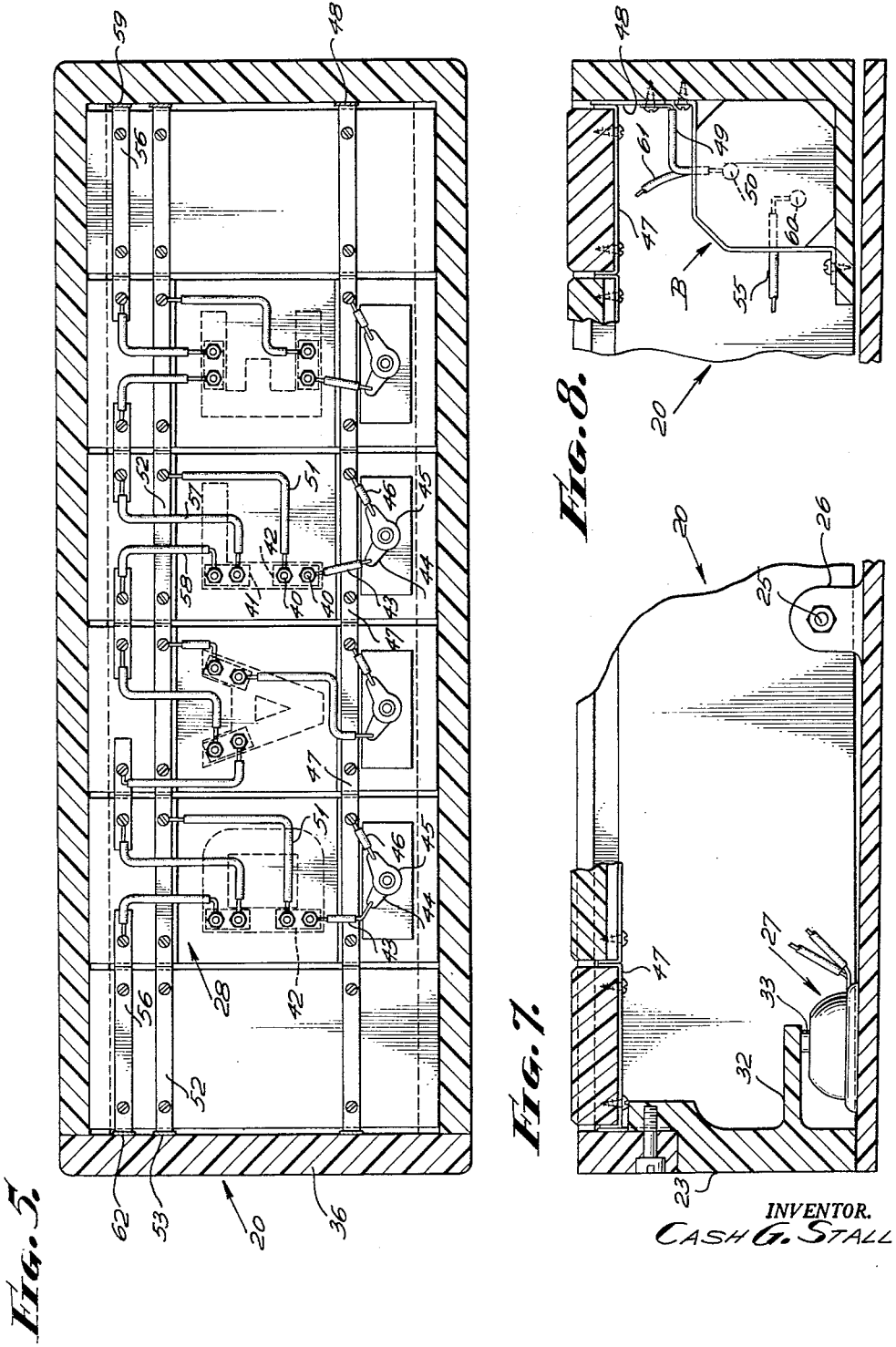

Jan. 9, 1962     C. G. STALL     3,015,895
EDUCATIONAL TOY
Filed Sept. 19, 1960     4 Sheets-Sheet 3
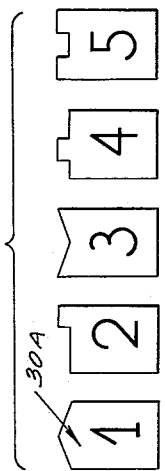
Fig. 10.
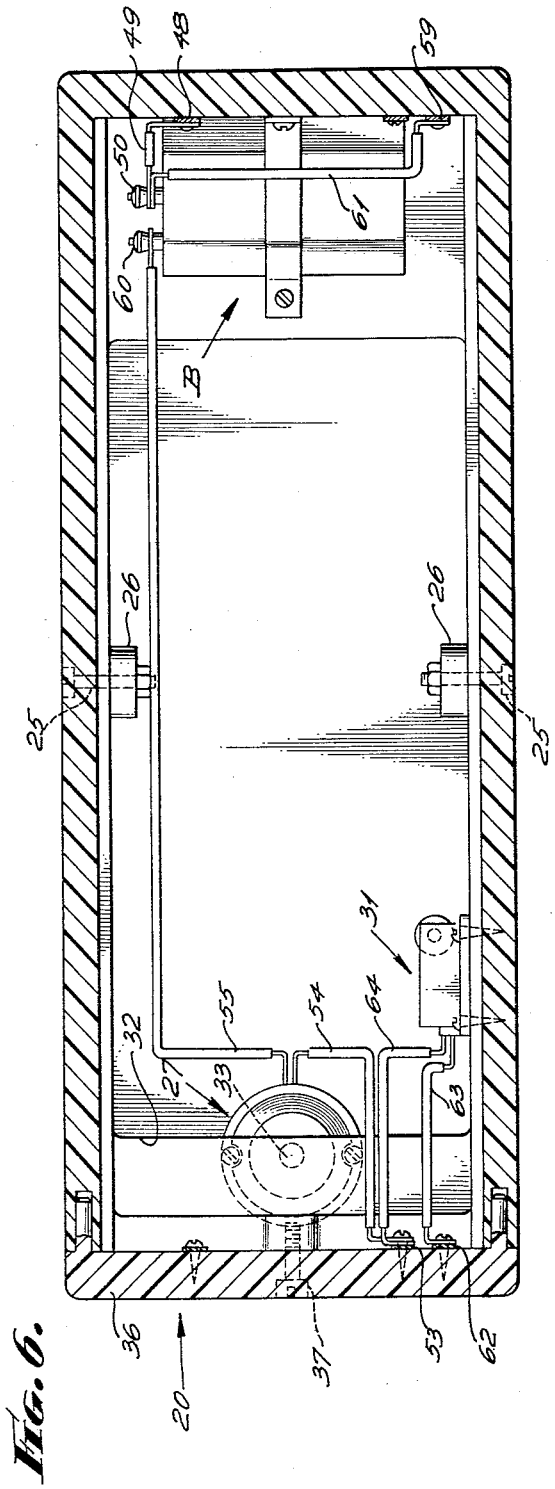
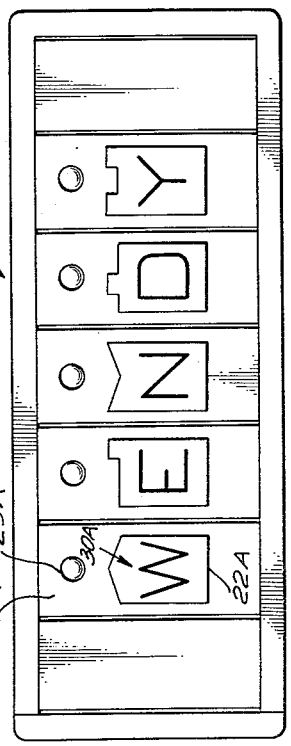
Fig. 9.
Fig. 6.
INVENTOR.
CASH G. STALL Jan. 9, 1962     C. G. STALL     3,015,895
EDUCATIONAL TOY
Filed Sept. 19, 1960     4 Sheets-Sheet 4
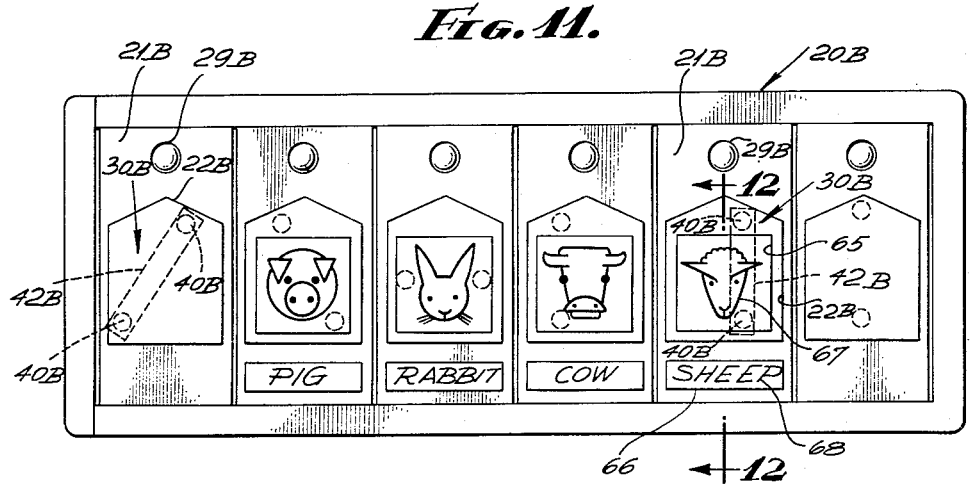
*Fig. 11.*
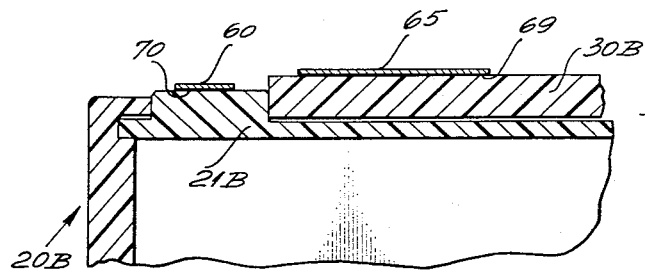
*Fig. 12.*
*Fig. 13.*
*Fig. 14.*
INVENTOR.
CASH G. STALL

United States Patent Office 3,015,895
Patented Jan. 9, 1962

3,015,895
EDUCATIONAL TOY
Cash G. Stall, Manhattan Beach, Calif., assignor of one-tenth to Gadget-Of-The-Month Club, Inc., North Hollywood, Calif., a corporation of California
Filed Sept. 19, 1960, Ser. No. 56,716
7 Claims. (Cl. 35—35)

The present invention consists of an educational toy adapted to teach the correlation between related symbols—particularly to a young child who is not inclined to study just for the sake of study alone, but is quite willing to learn if it is incidental to playing with a toy or game. In other words, the educational toy of the present invention acts as a device for teaching a child the correlation between related symbols and does so in a pleasant manner requiring virtually no conscious effort on the part of the child except that which is incidental to playing with the toy.

It is an object of the present invention to provide an educational toy of the character referred to above which is of simple, rugged, foolproof construction ideally suitable for use by a child since there is virtually nothing to get out of order despite the customary rough usage which can be expected from a child.

Further objects are implicit in the detailed description which follows hereinafter and will be apparent to persons skilled in the art after a careful study thereof.

For the purpose of clarifying the nature of the present invention, several exemplary embodiments are illustrated in the hereinbelow-described figures of the accompanying four sheets of drawings and are described in detail hereinafter.

FIG. 1 is an oblique view showing one exemplary embodiment of the present invention, with one of the insert members being shown in exploded relationship with respect to the corresponding recess-defining portion carried by the hollow housing, thus clearly showing portions of the plurality of switch means adapted to be closed by the insertion of the proper one of the four insert members into the proper one of the four recess-defining portions whereby to correspondingly energize the lamps carried by the recess-defining portions to indicate the proper correlation of insert member with recess-defining portion.

FIG. 2 is a fragmentary sectional view, taken in the direction of the arrows 2—2 of FIG. 1, showing the switch means (partially carried by the left recess-defining portion shown in FIG. 1 and partially carried by the left insert member comprising the letter D shown in FIG. 1) after insertion of said insert member into said recess-defining portion. The purpose of this view is to clearly show, in closed relationship, the normally-open switch means adapted to be closed by insertion of the proper insert member into the corresponding recess defining portion, and while it shows only the left set of said cooperating elements as illustrated in FIG. 1, it should be understood that this is illustrative of the structure of each of the other three sets of corresponding switch elements.

FIG. 5 is a sectional view taken in the direction of the arrows 5—5 of FIG. 3.

FIG. 6 is a sectional view taken in the direction of the arrows 6—6 of FIG. 4.

FIG. 7 is a fragmentary sectional view taken in the direction of the arrows 7—7 of FIG. 1.

FIG. 8 is a fragmentary sectional view taken in the direction of the arrows 8—8 of FIG. 1.

FIG. 9 is a reduced-size top plan view of a slight modification of the insert members and recess-defining portions of the invention.

FIG. 10 is a top plan view illustrating a further modification of the insert members of FIG. 9.

FIG. 11 is a view generally similar to FIG. 9, but illustrates another modification of the insert members and recess-defining portions.

FIG. 12 is an enlarged fragmentary sectional view taken in the direction of the arrows 12—12 of FIG. 11 and illustrates the detail of the modified insert members and recess-defining portions. None of the structure contained within the housing is shown in this view for drawing simplification reasons, it being understood that it is similar to that shown in the first form of the invention described and illustrated in detail hereinbefore.

FIG. 13 is a view illustrating a different set of symbol-depicting means adapted to be fastened to the upper surfaces of corresponding ones of the insert members of FIGS. 11 and 12 in lieu of the symbol-depicting means shown in FIGS. 11 and 12.

FIG. 14 is a view illustrating an alternate set of symbol-depicting means adapted to be fastened to the corresponding panels adjacent the recess-defining portions in lieu of those shown in FIGS. 11 and 12, for correlation with the symbol-depicting means shown in FIG. 13 which are adapted to be carried by the insert members of FIGS. 11 and 12 in lieu of those shown in FIGS. 11 and 12.

Figure 1:
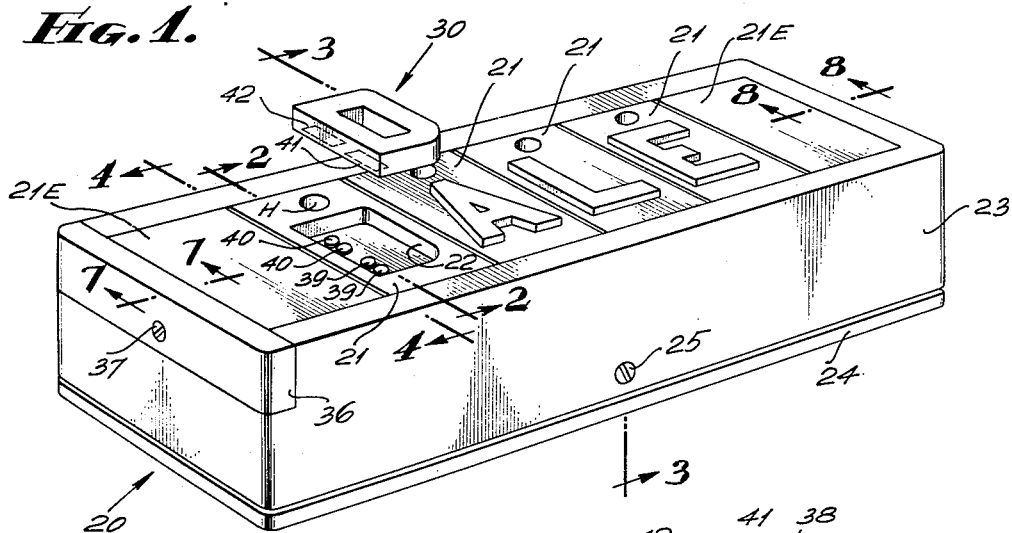
Figure 3:
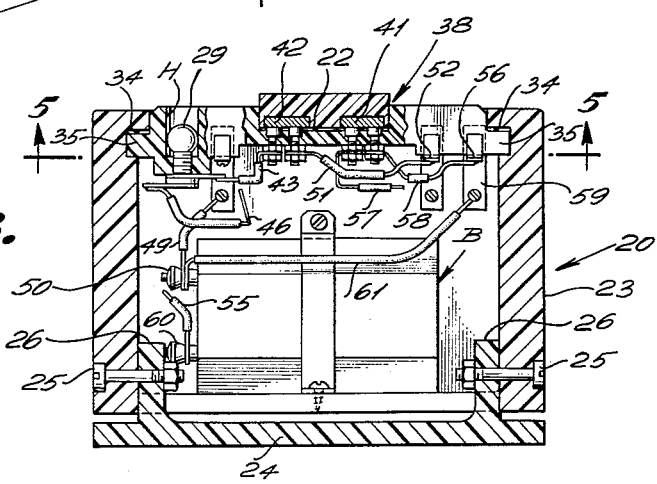
FIG. 3 is a sectional view taken in the direction of the arrows 3—3 of FIG. 1.
Figure 4:
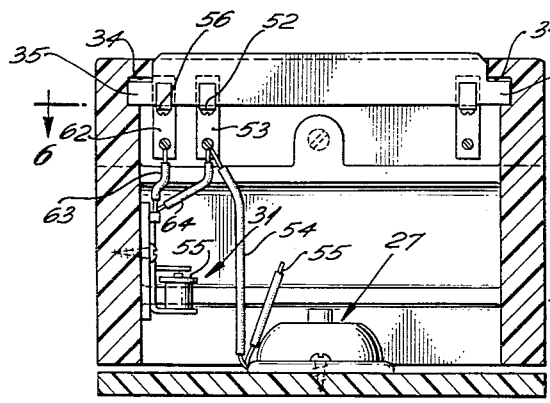
FIG. 4 is another sectional view taken in the direction of the arrows 4—4 of FIG. 1.
Figure 2:
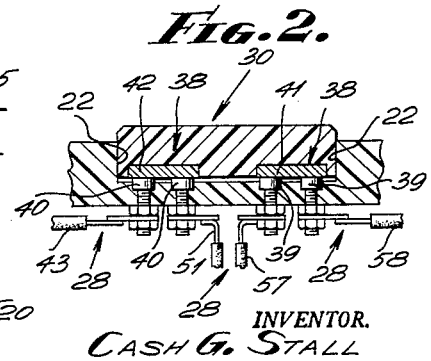

Referring to FIGS. 1–8 for exemplary purposes, one illustrative embodiment of the invention takes a typical exemplary form wherein it comprises a hollow housing, indicated generally at 20, which is of substantially rectangular parallelopiped shape having a top wall consisting of a plurality of panel portions 21 each provided with a downwardly directed and differently-shaped receiving recess-defining portion as indicated at 22. The top wall also includes two end panels 21E which are not provided with receiving-defining portions such as those indicated at 22 in each of the four center top panel portions 21. The hollow housing 20 comprises an upper portion 23 consisting of two parallel end walls and two parallel side walls which effectively slidably and removably carry all of the four central panel portions 21 and the two end panel portions 21E in a manner which will be described in detail hereinafter. The housing 20 also includes a flat lower base 24 which underlies and is slightly vertically spaced from the upper portion 23 of the housing 20 and is effectively pivotally connected with respect thereto by transverse bolt and nut means 25 connecting each of the side walls of the upper portion 23 with respect to corresponding upstanding side flanges 26 carried by the base portion 24 inside of the side walls of the upper portion 23 of the housing. This is best shown in FIGS. 3, 6 and 7, and provides an arrangement where the upper portion of the housing may be rocked about a horizontal axis extending through the pivotal mounting bolts 25. This is for the purpose of controllably closing an energizing switch, indicated generally at 27, which is connected in series with the electric circuit means, indicated generally at 28, which will be described in greater detail hereinafter, and in series with the batttery, indicated generally at B, whereby to place the electric circuit means 28 in a condition suitable for energization of any of a plurality of signal light means, such as the one shown at 29 in FIG. 3, positioned in any of a corresponding plurality of holes H in the four central top panel members 21 when the proper insert member 30 is inserted in the corresponding recess-defining portion 22.

In other words, when any one of the four insert members 30 shown in the first version of the invention illustrated in FIGS. 1–8 is inserted into the proper recess-defining portion 22, switch means, which will be described hereinafter, will effectively energize the corresponding lamp 29 to indicate to a child playing with the device that he has correctly matched the corresponding insert member 30 and recess-defining portion 22.

The above-referred-to closure of the energizing switch 27 also places the electric circuit means 28 in condition for energization of a suitable sound-producing buzzer signal means, indicated generally at 31, when all of the insert members 30 have been properly placed in the car-recess defining portions 22. This is accomplished by switch means associated with the recess-defining portions 22 and insert members 30, which will be described in detail hereinafter.

The closure of the energizing switch 27 and the readying of the circuit means 28 for energization of any of the individual signal means 29, or the common signal means 31 is accomplished when the left end of the upper housing portion 23 shown in FIG. 7 is depressed, which causes an inwardly projecting member 32 carried by the upper housing portion 23 to move downwardly and strike a push button 33 of the energizing switch 27.

The slidably removable and positionally interchangeable mounting of the panel members 21 (and also the end panel members 21E) is provided by means of opposed grooves 34 carried by opposed side walls of the upper housing portion 23, which slidably receive corresponding projecting edges 35 of the panel members 21 and 21E. Access to the ends of the grooves 34 is provided by closure strip means 36 fastened by suitable threaded fastener means 37 to the upper portion 23 of the housing. This provides an arrangement where the closure strip means 36 may be removed and the panel members 21 and 21E may be removed, interchanged, and replaced in any desired order.

Each of the insert members 30 visibly indicates its own symbol. For example, in the form of the invention illustrated in FIGS. 1-8, each of the insert members 30 is differently shaped so as to correspond to four different letters of the alphabet. Furthermore, for illustrative purposes only, it should be noted that when the four central panel members 21 are mounted in the grooves 34 in the arrangement shown in FIG. 1, insert members 30, when correspondingly inserted into the recess-defining portions 22, will spell out the name "Dale." However, this is illustrative only and it should be understood that any desired word, name, mathematical expression, equation, sum, difference, or the like, may be substituted for the word "Dale," and the recess-defining portions and insert members may be correspondingly varied. The main thing to note is that when each insert member 30 is inserted into the proper recess-defining portion 22, the battery B acts through the electric circuit means 28, and the switch means, indicated generally at 38 (best shown in FIG. 2) to energize the corresponding lamp means 29. Furthermore, if all of the insert members 30 are inserted correspondingly into the corresponding recess-defining portions 22, the battery B acts through the electric circuit means 28 and the switch means 38 to energize the buzzer 31.

Each of the normally open switch means 38 corresponding to each recess-defining portion 22 and each insert member 30 includes two pairs of switch portions 39 and 40 comprising metal contacts extending upwardly from the bottom of the recess-defining portion 22, and also comprises two corresponding switch elements 41 and 42 carried by the underneath surface of the corresponding insert member 30 and adapted to electrically connect each of the pairs of switch contacts 39 and 40, respectively, when the proper insert member 30 is inserted into the correct recess-defining portion 22. In one preferred form, each of the switch elements 41 and 42 may comprise a permanent magnet, while the corresponding pairs of contacts 39 and 40 may comprise ferromagnetic material, thus providing an arrangement whereby the insert member 30 is forcibly retained within the recess-defining portion 22 while each pair of the contacts 39 and 40 is positively electrically connected by the switch elements 41 and 42. It should be noted that, in the example illustrated, the pair of contacts 40 adapted to be closed by the switch element 42 effectively comprise the switch which closes the circuit to the corresponding lamp means 29 by way of a lead 43 connected to a lamp base connector 44. The lamp 29 has its other terminal connected by the other lamp base connector element 45 through a lead 46 to an electrical connector strip 47 of a plurality of such strips carried by corresponding ones of said panel members 21 and 21E thereunder and adapted to be connected at an end thereof to an electrically conductive member 48 which is connected by a lead 49 to one terminal 50 of the battery 29. The other contact 40 of the pair of contacts closed by the switch element 42 is connected by a lead 51 to an electrical connector strip 52 of a plurality of such strips carried by corresponding ones of said panel members on the opposite side of the recess-defining portions 22 from the other such strip 47 previously described. This strip 52 connects at the end with an electrically conductive member 53 which is connected by a lead 54 through the energizing switch 27, to a lead 55 which connects to the other terminal 60 of the battery B. This provides an arrangement where the butting end-to-end contact of each of the metallic strip sections 47 and 52 provides a closed circuit through any of the pairs of contacts 40 closed by the corresponding switch element 42 when the corresponding insert member 30 is inserted into the correct recess-defining portion 22, whereby to energize the corresponding lamp means 29. This indicates to a child that he has correctly matched the insert member 30 and the recess-defining portion 22. This is true of each corresponding pair of insert members and recess-defining portions whereby the corresponding individual lamps 29 will light when proper matching of any such set occurs.

The undersurface of each of the panel members 21 and 21E also carries another strip-type electrical connector 56 consisting of a group of sections of such strip arranged for abutting end-to-end contact when the panel members 21 and 21E are in abutment but with leads 57 and 58 interconnecting the strip portions 56 of any given panel member through the pair of contacts 39 when the corresponding switch element 41 of the corresponding insert member 30 is in contact therewith by reason of the insertion of the insert member 30 into the correct recess-defining portion 22. Thus, it will be seen that, when every insert member 30 is correctly inserted into the proper recess-defining portion 22, then the strip 56, each of the pairs of leads 57 and 58, each of the pairs of contacts 39, and each of the switch elements 41, will form a closed circuit through an electrically conductive member 59 and a lead 61 to the terminal 50 of the battery B and through an electrically conductive element 62 at the opposite end of the housing 20 and a lead 63, through the buzzer 31 and a lead 64 to the electrically conductive member 53 which, as previously mentioned, is connected through the lead 54, the energizing switch 27, and the lead 55 to the other terminal 60 of the battery B. This provides an arrangement of the electric circuit means 28 wherein the buzzer 31 will sound when all of the insert members 30 have been inserted correctly into the corresponding recess-defining portions 22.

FIG. 9 is a reduced-size top plan view of the apparatus wherein each of the panel members 21A has a recess-defining portion 22A of a different shape (but comprising a smaller total number of different shapes than would be the case in the first form of the invention which illustrates recess-defining portions and insert members of an alphabetical type, which would thus total at least 26 in number). In this modified form, there are only five distinctly different shapes of recess-defining portions 22A and insert members 30A. However, the toy may include a number of such sets of five insert members bearing different symbol-depicting portions on the top thereof such as the letters W, E, N, D, and Y shown in FIG. 9, the numerals, 1, 2, 3, 4 and 5, shown in FIG. 10, or any other desired type of symbol-depicting means.

FIGS. 11 and 12 illustrate another slight modification of the form of the invention illustrated in two variants in FIGS. 9 and 10. In this modification, similar parts are indicated by similar reference numerals, followed by the letter "B." The main difference of this modification of the invention from those illustrated hereinbefore is that each of the recess-defining portions 22B is of the same shape and, therefore, each of the insert members 30B is also of the same shape. Thus, a child might position any insert member 30B in any of the recess-defining portions 22B. However, this will not produce energization of the corresponding lamp means 29B unless the proper insert member 30B is inserted into the corresponding proper recess-defining portion 22B because the contacts 40B are differently positioned in each recess-defining portion 22B and, correspondingly, the switch element 42B carried by the insert member 30B is differently positioned in each instance. Thus, only the proper insert member 30B will electrically connect the switch contacts 40B and energize the lamp 29B. This proper correlation of insert members 30B and recess-defining portions 22B is determined by the removable thin-sheet elements 65 and 66, which comprise symbol-depicting means bearing symbols 67 and 68, which correspond to each other. The thin-sheet element 65 is adhesively fastened by adhesive means 69 to the upper surface of the insert member 30B, while the other thin-sheet element 66 is adhesively fastened by adhesive fastening means 70 to the upper surface of the corresponding panel member 21B. This provides an arrangement where the child is intended to insert the insert member 30B bearing the picture of the sheep into the recess-defining means 22B in the same panel member 21B bearing the word "sheep," and so on for the rest of the pairs of symbol-depicting means comprising the elements 65 and 66, which are removable and interchangeable at will so that a very large number of such adhesively mountable elements may be provided for the purpose of variety.

FIGS. 13 and 14 merely illustrate alternate adhesively mountable symbol-depicting elements 65′ and 66′ corresponding to the same elements shown at 65 and 66 in FIGS. 11 and 12, but being different as to the symbols depicted thereby and thus illustrating the interchangeable feature of the symbol-depicting means.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. An educational toy adapted to teach the correlation between related symbols, comprising: a hollow housing of substantially rectangular parallelopiped shape having a top wall provided with a plurality of downwardly directed different receiving recess-defining portions, said housing top wall being formed of a plurality of removable interchangeable panels, with each panel carrying one of said receiving recess-defining portions, whereby they can be removed and repositioned or replaced to provide different sets of meaningful correlations of symbols; a corresponding plurality of different insert members removably received within the corresponding ones of said recess-defining portions, the insert member means received by the corresponding recess-defining portions visibly indicating a correct correlation of symbols for educational purposes; normally open switch means corresponding to each of said receiving recess-defining portions and each including a first switch portion positioned within the corresponding receiving recess-defining portion and a second switch portion carried by the corresponding insert member and adapted to close the switch means when said insert member is received within said receiving recess-defining portion; and electric circuit means adapted to be connected to a suitable source of electric power and connected to the plurality of first switch portions in a group of parallel branches, each provided with an individual signal light means whereby closure of any of said first switch portions by insertion of the corresponding insert member into the correlated receiving recess-defining portion will energize said signal light means to produce a visible signal indicating correct correlation of symbols.

2. An educational toy of the character defined in claim 1, including sound-producing buzzer group signal means connected in said electric circuit in series with all of said second switch portions whereby to be audibly energized upon correct correlation and insertion of all of the insert members into the corresponding receiving recess-defining portions whereby to audibly indicate the complete correct correlation of an entire set of symbols.

3. An educational toy of the character defined in claim 1, wherein the insert members define visibly observable individual symbol depicting means.

4. An educational toy of the character defined in claim 1, wherein the top walls of the panels adjacent the receiving recess-defining portions define visibly observable individual symbol depicting means having a one-to-one correspondence with correlated symbol depicting means of the insert members.

5. An educational toy of the character defined in claim 1, wherein the insert members define visibly observable individual symbol depicting means, and wherein the top walls of the panels adjacent the receiving recess-defining portions define visibly observable individual symbol depicting means having a one-to-one correspondence with correlated symbol depicting means of the insert members, said symbol-depicting means comprising thin-sheet elements visibly demarked with corresponding symbols and provided with adhesive fastening means thereunder for removable fastening attachment with respect to the corresponding insert members and panels.

6. An educational toy of the character defined in claim 1, wherein said electric circuit means includes a plurality of electrically conductive strips carried by the panels and having end contact portions positioned for electrically conductive end abutment whereby the panels may be positionally interchanged in any desired manner while maintaining the entire electric circuit means in electrically conductive condition.

7. An educational toy of the character defined in claim 1, wherein said housing comprises an upper portion and a lower base, with the upper portion being pivotally mounted with respect to the lower base and being provided with energizing switch means pivotally interconnected for closure upon rocking movement of the upper portion of the housing with respect to the base, said energizing switch means being electrically connected in series in said electric circuit means.

References Cited in the file of this patent

UNITED STATES PATENTS

| | | |
|---|---|---|
| 2,505,230 | Composto | Apr. 25, 1950 |
| 2,539,077 | Hawkins | Jan. 23, 1951 |
| 2,612,708 | Amsel | Oct. 7, 1952 |
| 2,656,617 | Composto | Oct. 27, 1953 |
| 2,872,741 | Krueger et al. | Feb. 10, 1959 |